United States Patent [19]

Swanbeck et al.

[11] 3,806,593

[45] Apr. 23, 1974

[54] HYGIENIC-COSMETIC COMPOSITIONS

[75] Inventors: Gunnar P. E. Swanbeck, Vaxholm; V. Monica Schalin, Uppsala, both of Sweden

[73] Assignee: Medisan AB, Uppsala, Sweden

[22] Filed: May 30, 1972

[21] Appl. No.: 257,924

[30] Foreign Application Priority Data
June 1, 1971   Great Britain.................... 18289/71

[52] U.S. Cl.................. 424/28, 117/154, 128/260, 162/161, 424/311, 424/316
[51] Int. Cl....................... A61l 15/03, A61k 27/00
[58] Field of Search...................... 424/28, 311, 316

[56] References Cited
UNITED STATES PATENTS
3,150,049   9/1964   Emory.................................. 424/28
3,264,188   8/1966   Gresham............................. 424/28

OTHER PUBLICATIONS

Mellan, Industrial Solvents (1950) pp. 734–739.

Durrans, Solvents (1950), pp. 141–143.

Merck Index 8th Edition 1968 p. 430.

Chemical Abstracts 70:118128w (1969).

Chemical Abstracts 64: 9518d (1966).

Greenberg et al. Handbook of Cosmetic Materials (1954), pp. 29–30, 127, 139, 271.

Primary Examiner—Albert T. Meyers
Assistant Examiner—Norman A. Drezin

[57]   ABSTRACT

The present invention relates to novel hygienic-cosmetic compositions for the treatment of skin, especially for the treatment of acne. The compositions consist of 2 – 50 percent by weight of ethyl lactate, isopropyl lactate and/or glycerol mono or dilactate, preferably up to 10 percent by weight of glycerol and/or propylene glycol, whereas the remainder of the composition, which is virtually water-free, essentially consists of ethyl and/or isopropyl alcohol.

8 Claims, No Drawings

HYGIENIC-COSMETIC COMPOSITIONS

BACKGROUND OF THE INVENTION

The present invention relates to novel hygienic-cosmetic compositions which may be applied to the skin for preventing the formation of acne or decreasing already established acne. The compositions can also be used for the treatment of other mainly cosmetic skin conditions such as pityriasis oleosa capitis. The said skin conditions are common and they are not regarded as illnesses but as minor disturbances in otherwise quite normal skin.

Acne is a cosmetic problem which in many cases may be of a disturbing proportion. An important factor for the occurrance of acne is the presence of bacteria in the sebaceous glands in the skin, especially Corynebacterium acne. It is known that the bacteria in the sebaceous glands form esterases which hydrolyze the sebum fats to alcohols and free fatty acids. Further, it is known that certain free fatty acids may obstruct the openings of the sebaceous glands by inducing an increased cornification. The presence of bacteria and an increased sebum production in the sebaceous glands are regarded to be the main factors in the acne formation.

The cosmetic acne-preventing or acne-diminishing composition according to the invention is based on the bacterial esterase activity in the sebaceous glands which together with the water already present in the skin can hydrolyze an ester having a good penetration capacity into the sebaceous glands, to the formation of one and preferably two antibacterially active components, viz. an acid and an alcohol, which are harmless to the skin.

DESCRIPTION OF THE INVENTION

The principal active compound in the composition according to the invention is one or more esters chosen from the group consisting of ethyl lactate, isopropyl lactate and/or glycerol mono or dilactate. The said esters hydrolyze in the sebaceous glands due to the esterases present in the glands to the formation of the corresponding acids and alcohols. Lactic acid and the said lower alcohols and also glycerol to a certain extent exert a good antibacterial activity when formed in situ in the sebaceous glands. The above-mentioned esters are lipophilic and can thus penetrate into the openings of the sebaceous glands and down to the said glands.

The preferred ester according to the invention is ethyl lactate which may originate from racemic as well as optically active lactic acid. It is, of course, possible to use mixtures of the above-mentioned esters.

Even if a beneficial action can be achieved by application of the ester or esters per se it has been found to be suitable to apply the ester in the form of a solution in ethyl alcohol or isopropyl alcohol. Mixtures of the said alcohols can also be used. It is required that the alcohols used as well as all other components in the compositions are water-free or practically water-free for preventing hydrolysis of the ester already in the composition. It has been found that ordinary so-called absolute alcohol, viz. alcohol of 99.5 percent purity, will be sufficient for the purpose of the invention. The presence of alcohol also brings the advantage that hydrolysis of the ester already in the composition is prevented since the alcohol moves the hydrolysis equilibrium towards ester formation. The alcohol can also facilitate the penetration of the ester into the skin.

As is well-known alcohol in high concentrations may cause a drying-out of the skin. So as to counteract this effect the above-mentioned composition may be admixed with a moisture-retaining agent such as a lower, suitably water-free polyol, viz. propylene glycol or glycerol. The content of propylene glycol or glycerol in the composition according to the invention may be up to 25 percent, suitably not more than 10 percent by weight and preferably 1 – 5 percent. High levels of polyol tend to make the composition smeary upon application on the skin and should thus be avoided.

Accordingly, the invention relates to a hygienic-cosmetic composition for the treatment of skin, especially for the treatment of acne, which is characterized in that it consists of 2 – 50 percent by weight of ethyl lactate, isopropyl lactate and/or glycerol mono or dilactate, preferably up to 25 percent by weight of glycerol and/or propylene glycol, whereas the remainder of the composition, which is practically or virtually water-free, essentially consists of ethyl and/or isopropyl alcohol. It is especially preferred that the composition contains 10 – 30 percent by weight of the ester component and 1 – 5 percent by weight of the polyol component.

The preferred composition according to the invention consists of about 15 percent by weight of ethyl lactate, about 2 percent by weight of propylene glycol, the remainder being ethyl alcohol.

The invention also comprises a skintreating method, especially for the treatment of acne, in which the composition is applied to the skin. The application of the composition is made in any conventional manner such as by bathing. Excellent results in the treatment of acne and pityriasis oleosa are obtained by application once or several times daily.

A preferred embodiment of the invention is to apply the composition with the aid of a so-called medicated compress. Such a compress conventionally consists of a fibrous pad, soaked with the composition according to the invention and located within an evaporation-proof envelope which usually consists of aluminum foil or similar. When the pad is to be used the said envelope is opened, for instance by cutting with a pair of scissors along three edges and the pad which is fixedly located in the envelope is pressed against the skin area to be treated with the hand. When applied in this manner the composition does not evaporate as rapidly as otherwise would be the case and a good penetration is ensured which is further enhanced by the increase of temperature in the composition due to the absence of evaporation and the warming effect of the skin and the hand.

The invention also comprises a process for preparing a hygienic-cosmetic composition for the treatment of skin, especially for the treatment of acne, which comprises mixing of 2 – 50 percent by weight of ethyl lactate, isopropyl lactate and/or glycerol mono or dilactate, preferably up to 25 percent, especially up to 10 percent and preferably 1 – 5 percent by weight of glycerol or propylene glycol with ethyl alcohol or isopropyl alcohol which essentially forms the remainder of the composition.

The invention is further elucidated with the following examples showing typical compositions according to the invention.

| Components | Example | | | | | |
|---|---|---|---|---|---|---|
| | 1 | 2 | 3 | 4 | 5 | 6 |
| Ethyl lactate | 15% | 5% | 10% | 10% | 20% | 30% |
| Ethanol, 99.5% | 83% | 75% | 80% | 83% | 80% | 69% |
| Propylene glycol | 2% | 20% | 10% | — | — | — |
| Water-free glycerol | — | — | — | 7% | — | 1% |
| Perfume | q.s. | q.s. | q.s. | q.s. | q.s. | q.s. |

Example 7.

| | |
|---|---|
| Glycerol dilactate | 15% |
| Ethanol, 99.5% | 85% |

Clinical investigations have shown that a notable acne decrease is obtained with the above compositions when applied to the skin once or several times daily.

We claim:

1. A method of treating acne comprising applying to the acne lesion on the skin of a person suffering therefrom, an anti-acne effective amount of a composition comprising 2 to 50 percent by weight of an ester selected from the group consisting of ethyl lactate, isopropyl lactate, glycerol monolactate and glycerol dilactate in a medium selected from the group consisting of ethyl alcohol and isopropyl alcohol wherein all components are water-free or practically water-free.

2. The method of claim 1 wherein said composition contains 10 to 30 percent by weight of said ester component.

3. The method of claim 1, wherein said composition further comprises up to 25 percent by weight of a polyol selected from the group consisting of glycerol and propylene glycol.

4. The method of claim 3, wherein said composition contains 1 to 5 percent by weight of said polyol component.

5. The method of claim 3, wherein said composition contains 10 to 30 percent by weight of said ester component, 1 to 5 percent by weight of said polyol component, the balance being said alcohol medium.

6. The method of claim 3, wherein said composition comprises about 15 percent by weight of ethyl lactate, about 2 percent by weight of propylene glycol, the remainder being ethyl alcohol.

7. A medicated pad for the treatment of acne, comprising a fibrous tissue in an envelope preventing evaporation, the pad containing an anti-acne effective amount of a composition comprising 2 to 50 percent by weight of an ester selected from the group consisting of ethyl lactate, isopropyl lactate, glycerol monolactate and glycerol dilactate in a medium selected from the group consisting of ethyl alcohol and isopropyl alcohol wherein all components are water-free or practically water-free.

8. The medicated pad of claim 7, wherein said composition contains up to 25 percent by weight of a polyol selected from the group consisting of glycerol and propylene glycol.

* * * * *